(12) United States Patent
Bramoulle et al.

(10) Patent No.: US 7,779,070 B2
(45) Date of Patent: Aug. 17, 2010

(54) REMOTELY CONTROLLABLE SOFT KEYS

(75) Inventors: Eric Bramoulle, Brest (FR); Yann Grostete, Brest (FR)

(73) Assignee: Alcatel Lucent, Paris (FR)

( * ) Notice: Subject to any disclaimer, the term of this patent is extended or adjusted under 35 U.S.C. 154(b) by 729 days.

(21) Appl. No.: 11/599,321

(22) Filed: Nov. 15, 2006

(65) Prior Publication Data

US 2007/0156828 A1 Jul. 5, 2007

(30) Foreign Application Priority Data

Jan. 4, 2006 (EP) .................................. 06290056

(51) Int. Cl.
*G06F 15/16* (2006.01)
(52) U.S. Cl. ................. 709/203; 709/201; 709/202; 709/217; 709/246; 370/352; 370/389
(58) Field of Classification Search ......... 709/201–203, 709/217–219, 246
See application file for complete search history.

(56) References Cited

U.S. PATENT DOCUMENTS

| | | | | | |
|---|---|---|---|---|---|
| 6,990,524 | B1 * | 1/2006 | Hymel | ........................ | 709/227 |
| 7,076,458 | B2 * | 7/2006 | Lawlor et al. | .................. | 705/35 |
| 7,313,592 | B1 * | 12/2007 | Huboi et al. | ................. | 709/203 |
| 7,660,295 | B2 * | 2/2010 | Allan et al. | ................. | 370/352 |
| 2002/0027927 | A1 * | 3/2002 | Barzegar et al. | ............. | 370/436 |
| 2003/0043974 | A1 * | 3/2003 | Emerson, III | ............. | 379/88.13 |
| 2003/0103088 | A1 * | 6/2003 | Dresti et al. | ................. | 345/835 |
| 2005/0125083 | A1 * | 6/2005 | Kiko | ........................... | 700/19 |
| 2005/0216606 | A1 * | 9/2005 | Hayes et al. | .................... | 710/5 |
| 2006/0122814 | A1 * | 6/2006 | Beens et al. | ................. | 702/189 |
| 2007/0155411 | A1 * | 7/2007 | Morrison | ..................... | 455/466 |

FOREIGN PATENT DOCUMENTS

| | | | |
|---|---|---|---|
| EP | 1 496 677 | A1 | 1/2005 |
| EP | 1 564 945 | A1 | 8/2005 |
| EP | 1564945 | A1 * | 8/2005 |
| GB | 2 365 734 | A | 2/2002 |
| WO | WO 05006162 | A2 * | 1/2005 |

OTHER PUBLICATIONS

P. Christal, Making Mobile Phone Features Easy Siemens GSM Handheld Phones Feature a Sophisticated User Interface for Exceptional Ease of Use, Telcom Report International, Munich, DE, vol. 17, No. 1, 1994, p. 25-28, XP000618980.
Robert Bell et al, Megaco IP Phone Media Gateway:, IETF Standard-Working-Draft, Internet Engineering Task Force, IETF, CH, vol. megaco, Jun. 25, 1999, XP015022823.
Audio-Video Transport Working Group et al, RTP: A Transport Protocol for Real-Time Applications; rfc1889.txt; IETF Standard, Internet Engineering Task Force, IETF, CH, Jan. 1996, XP015007673.

* cited by examiner

*Primary Examiner*—Wing F Chan
*Assistant Examiner*—Razu A Miah
(74) *Attorney, Agent, or Firm*—Fay Sharpe LLP

(57) ABSTRACT

A method to remotely interact with an application server (4) of a Unified Messaging System (1) via an end user terminal (2) featuring soft keys is described, wherein at least one functionality dedicated to at least one soft key is remotely controllable by the application server (4) in real time. Furthermore a communication system (1), a terminal (2) and a server (3, 4) to be used to execute the method, and a computer program product comprising computer readable program for causing a computer to perform the method are described.

15 Claims, 1 Drawing Sheet

REMOTELY CONTROLLABLE SOFT KEYS

The invention is based on a priority application EP 06 290 056.8 which is hereby incorporated by reference.

TECHNICAL FIELD

The invention relates to a method to remotely interact with an application server of a Unified Messaging System via an end user terminal featuring soft keys, wherein said terminal is remotely attached to said application server providing at least one communication service, plus a communication system, a terminal and a server to be used to execute said method.

BACKGROUND OF THE INVENTION

Unified Messaging Systems (UMS) are communication systems providing a plurality of communication services such as email, SMS, voicemail, answering machine, fax, telephone and the like, wherein UMS allow to catenate the different communication services with each other. So UMS allows e.g. to send a fax to an email address, or to send a SMS or a MMS by email to a mobile phone, or to send an email or a SMS to a telephone, wherein the text of the email or the SMS is converted into speech, e.g. by a text-to-speech (TTS)-converter provided by a server. Furthermore UMS allows a user e.g. to access his emails via mobile phone.

A UMS typically consists of one or more servers and one or more end user devices remotely attached to and remotely controllable by said server. The server provides one or more applications dedicated to the end user device, wherein each application provides at least one communication service to be used via said end user device.

A focus in the development of UMS is to provide a single end user device that allows using all or at least some of the described communication services. Such an end user device typically comprises a terminal similar to a conventional desktop or cordless telephone set with at least a microphone, a loudspeaker and several buttons required to dial a telephone number, wherein to provide the additional communication services such a terminal features e.g. a display such as a small monitor or the like to be used to display emails, SMS, faxes and the like, plus various buttons to be used to control the different communication services.

Thereby the problem arises that with an increasing number of communication services the number of buttons increases significantly, leading besides the poor design to poor usability since with an increasing number of buttons the clearness of the terminal vanishes.

To handle this, up to now the solution is followed to provide audio menus in combination with Automated Speech Recognition (ASR) when the context of a particular communication service is controlled by an appropriate application server. Thereby to deal with various menus and functionalities instead of buttons audio information is provided selectable by the user via voice input or by pressing a specific number on the keyboard. Thereby typically the menu items of a menu are read by a voice wherein the user can choose a menu item by voice input or by pressing a specific number on the keyboard. The disadvantage of such a solution is the immense complexity and costs in providing such features. Furthermore it is very time-consuming to interact with a menu via voice input.

Other solutions to deal with similar problems are known e.g. from scientific pocket calculators, telephone systems and remote controls of TV-Sets. Thereby so-called soft keys are used providing various functionalities depending on the menu actually used. Soft keys comprise either buttons arranged besides a display showing the actual functionality of the particular button, or comprise touch sensitive display areas, e.g. on a touch screen, showing the actual functionality of the particular area. Thereby the functionalities of the soft keys are hard-coded within the particular devices, wherein the software design of the device i.e. the particular functionalities of the soft keys within particular menus are fixed. Such a solution cannot be adapted to new functionalities, user behavior and the like.

Furthermore it is known to use soft keys in telecommunications e.g. to allow a user to individually configure functionalities of a terminal. So it is possible to configure a soft key in a way that it provides e.g. access data required for specific applications or functionalities when pushed by the user.

From GB 2 365 734 A it is known to use soft keys in combination with end user devices such as mobile phones and the like to be used to access source data of Internet web-pages or other mark-up language documents. Thereby functionalities to be assigned to the soft keys are identified within said source data. The identification can be done within the end user devices or it can be done on a source server or on a proxy server that after identification provides the end user device with data comprising the actual functionalities of the soft keys. Such a solution has the drawback of an immense complexity and of only low reliability. Furthermore identifying soft key functionalities from source data is too time-consuming.

From EP 1 496 677 A1 it is known to program soft keys of an end user device by the user himself or by receiving a configuration message automatically installing the soft key functionalities. The configuration message is received by means of infrared data access, Bluetooth, WAP/WEB download, computer based synchronization software or by a SMS or a MMS. After receiving the configuration message, the soft keys are hard-coded within the end user device. Thereby it is not foreseen to change the functionalities of the soft keys with changing communication services and the like. Due to this, such a solution is not suitable in combination with UMS.

Another disadvantage of known soft key solutions is the requirement of storage at the end user device required to store the different functionalities of the soft keys. Storage installed in end user devices is costly and can lead to complaints and callbacks due to damaged storages and hardware failures. Furthermore adapting end user devices providing hard coded soft key functionalities to new features, functionalities or communication services is very costly.

Regarding UMS the main problem remains that the different communication services provided by UMS provide different, possibly changing functionalities that have to be accessible in real-time by the user. The changing in and/or of functionalities can be justified e.g. by introducing new functionalities supported by new, improved or updated software on particular application servers providing particular communication services. So it is thinkable, e.g. in the course of usability improvements, to change functionalities or to change the sequence of functionalities provided by an application server providing a particular communication service, wherein to ensure and not to affect the availability of the UMS the changing preferably takes place in service. Furthermore it is thinkable that some functionalities or the sequence of functionalities depend on user behavior so that they can change according to user behavior. Due to this, it is not useful to hard-code soft key functionalities within an end user device to be used in combination with UMS.

SUMMARY OF THE INVENTION

An object of the invention is to develop a method to provide changing soft key functionalities to an end user device useable in combination with UMS, plus a communication system, a terminal and a server to be used to execute said method.

A first object of the invention is met by said method of said specifying features of claim 1, wherein the method is characterized in that at least one functionality dedicated to at least one soft key is remotely controllable by an application server in real time.

Said method with the specifying features of claim 1 has the advantage over the state of the art, that remotely providing and controlling soft key functionalities of an end user terminal by an application server in real time allows to operate a UMS quickly without waiting for all the voice prompt. Furthermore with the method according to the invention, it is easily possible to introduce new functionalities without changing anything on the user site, since changes only affect particular application servers that are remotely controlling the functionalities dedicated to all or some soft keys of the end user terminal. With the method according to the invention it is also possible to easily adapt functionalities or sequences of functionalities or the dedication of functionalities to the soft keys according to user behavior, improvements in usability and the like.

In a preferred embodiment of said method according to the invention, commands used from the application server to remotely control the soft key functionalities of the terminal are exchanged between the application server and the end user terminal via a real time protocol like e.g. Real Time Protocol (RTP), Real Time Control Protocol (RTCP), Voice eXtensible Markup Language (VXML) and the like.

In another preferred embodiment of said method according to the invention, specific returns generated by user inputs via said soft keys of the terminal are exchanged between the terminal and the application server via a real time protocol like e.g. RTP, RTCP, VXML and the like.

In a particularly preferred embodiment of said method according to the invention, a real time protocol is used to exchange audio messages, like e.g. telephone calls, video conferences, announcements, prompts and the like between the terminal and a server, e.g. the application server itself or a media server providing access to various applications or application servers, each application or application server providing at least one communication service, wherein parts of said real time protocol are used to at least partly transport commands used to remotely control the soft key functionalities as well as the specific returns generated by user inputs via said soft keys between the application server and the terminal and vice versa. Thereby it is thinkable that the terminal is not directly attached to an application server but a media server or the like is logically arranged between the application server and the terminal. The media server provides access to various application servers, each one providing a communication service to be used via the terminal. Thereby it is thinkable that to transport the commands and the specific returns between the application server and the terminal different real time protocols are required for different sections of the data link. So it is thinkable, that e.g. the media server and the application server communicate with each other using VXML, wherein the terminal and the media server communicate with each other using RTP. In this case, the commands and the specific returns to be exchanged between the application server and the terminal are partly transported using RTP, namely between the terminal and the media server, and partly transported using VXML, namely between the media server and the application server.

A preferred embodiment of the method according to the invention is characterized in that the commands used to remotely control the soft key functionalities and/or the specific returns generated by user inputs via said soft keys that have to be exchanged between the media server and the end user terminal and/or vice versa are at least partly transported using RTCP. Using RTCP is particularly of interest, if audio messages are exchanged between the terminal and the server and/or vice versa by RTP.

In another particularly preferred embodiment of said method according to the invention, the APP packet of the RTCP is used to at least partly transport the commands and/or the specific returns to be exchanged between the media server and the end user terminal and/or vice versa.

In an additional preferred embodiment of said method according to the invention, the commands and/or the specific returns to be exchanged between the application server and the media server and/or vice versa are at least partly transported using VXML.

A second object of the invention is met by a Unified Messaging Communication system to be used to execute the method described above, said communication system comprising of at least one server and at least one end user terminal remotely attached to and remotely controllable by said server, said server providing at least one application to be dedicated to said terminal, wherein said terminal features at least one soft key with at least one dedicated functionality, wherein said communication system further comprises means to remotely control at least one functionality dedicated to said soft key by said server in real time.

A third object of the invention is met by a terminal to be used in combination with a communication system described above, wherein said terminal comprises at least one soft key, means to dedicate at least one changeable functionality to said soft key and means to let a server of said communication system remotely control at least one functionality dedicated to said soft key in real time.

A fourth object of the invention is met by a server to be used in combination with a communication system according described above, wherein said server comprises means to remotely control at least one functionality dedicated to at least one soft key of a terminal remotely attached to said server in real time.

In another preferred embodiment of the invention, said method is performed by a computer program product stored on a computer usable medium comprising computer readable program means for causing a computer to perform the method mentioned above, when said computer program product is executed on a computer.

DETAILED DESCRIPTION OF PREFERRED EMBODIMENTS

Figure 1:
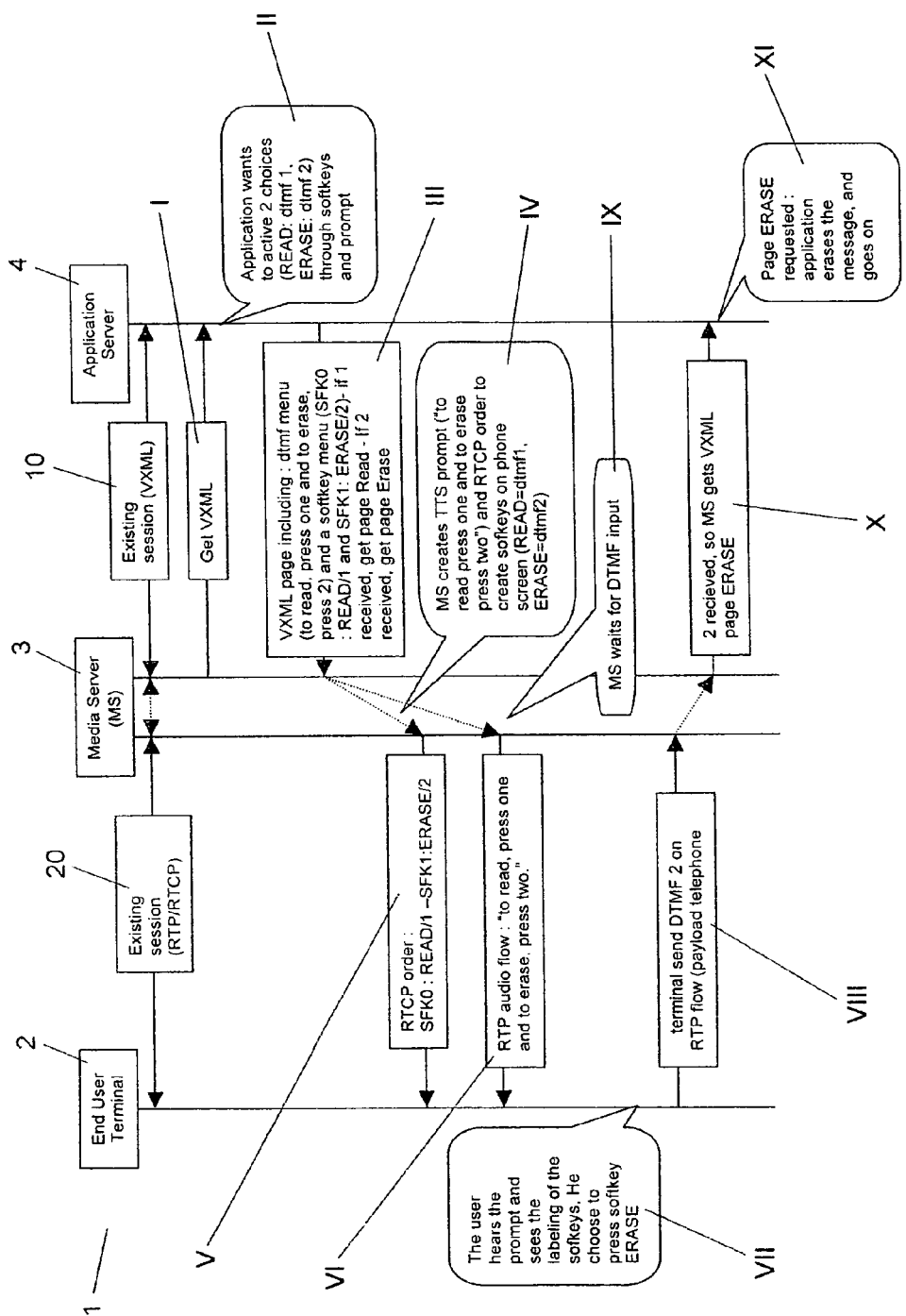
FIG. 1 showing a scheme of an execution of a method according to the invention.

As shown in FIG. 1, a Unified Messaging System 1 comprises of a plurality of end user terminals 2, at least one media server 3 and a plurality of application servers 4. The terminals 2 are remotely connectable to the application servers 4 via the media server 3. Thereby, according to a desired communication service, the media server 3 connects a terminal 2 to an appropriate application server 4.

The terminal 2 provides soft keys, wherein the functionalities dedicated to the soft keys are controllable by the application server 4. The media server 3 can be seen as a telephonic gateway for the application server 4. The application server 4 uses e.g. a VXML document indicating which functionalities dedicated to soft keys on the user terminal 2 are required. The media server 3 interprets the VXML document and executes it in a synchronous way with the terminal 2 and user inputs like e.g. specific return of the user. Commands comprising instructions about the functionalities dedicated to the soft keys on the user terminal 2 are transported using RTCP from the media server 3 to the user terminal 2. According to the command, specific functionalities are assigned to the soft keys on the terminal 2. User inputs via the soft keys are transformed by the user terminal 2 e.g. into Dual-Tone-Multi-Frequency (DTMF) and then are sent to media server 3. When receiving the specific return of the user, the media server 3 interprets the VXML document to see what to do. This can result in a new access to the application server 4.

The very first moment depictured on top of FIG. 1, a session is running between the terminal 2 and the application server 4 via the media server 3. The session is divided into two sub-sessions. One sub-session is the existing session 20 between the terminal 2 and the media server 3, the other sub session is the existing session 10 between the media server 3 and the application server 4. The session 10 uses VXML to exchange data between the application server 4 and the media server 3, wherein session 20 uses RTP/RTCP to do so between the media server 3 and the terminal 2.

In the first step I shown in FIG. 1, the media server 3 accesses the application server 4 by requesting a VXML page from the application server 4.

For the particular request, the application server 4 in a second step II has foreseen to provide two alternative choices. The choices are 'read' or 'erase'. From the view of the application server, both choices can be provided either by a prompt or by soft keys.

In a third step III the application server 4 provides the media server 3 with the requested VXML page. This VXML page includes commands required to remotely control functionalities dedicated to soft keys on the terminal 2, plus information required by the media server to generate Text To Speech (TTS) prompts according to the possible choices.

In a fourth step IV the media server 3 generates the TTS prompts according to the possible choices.

In a fifth step V the media server 3 forwards the command from the application server 4, which command comprises the functionalities to be dedicated to the soft keys of the terminal 2. The command is transported via RTCP.

Parallel to step V, in a sixth step VI the media server 3 forwards the TTS prompt that is now an audio stream. The audio stream is transported via RTP.

In a seventh step VII the user hears the prompt and sees the functionalities dedicated to the soft keys of his terminal 2. The user decides to push the soft key dedicated to the functionality 'erase'.

In an eight step VIII the terminal 3 sends back a specific return caused by the user input via the soft key with the dedicated function 'erase'. The specific return to be exchanged via the terminal 2 and the application server 4 via the media server 3 is sent via a RTP stream from the terminal 2 to the media server 3.

Parallel to the fifth, the sixth, the seventh and the eight step the media server 3 waits for a specific return from the terminal (step IX).

In a tenth step X, the media server 3 receives the specific return from the terminal and forwards this via VXML to the application server 4.

In an eleventh step XI the application server receives the specific return that comprises the information that the user has chosen to erase. The application server erases the specific message and goes on.

It is important to mention that not necessarily all functionalities dedicated to the soft keys of the terminal are controlled or controllable by the server. It is as well thinkable that some of the soft keys are programmed by the user, are hard coded and the like.

A main aspect of the invention is that the soft key functionalities of the terminal are controllable in real time by the application server. Preferably the soft key functionalities controlled by the application server are exchanged between the application server and the end user terminal by using a real time protocol.

Doing so, controlling the services of a UMS in real time via soft keys is possible. Many telephones offer soft keys e.g. in the form of touch sensitive screen areas, wherein up to now, no solution had existed to activate these keys if the control of the media is done by the application server.

Regarding a UMS, the session is controlled e.g. by a call server e.g. via SIP. Once the session is established, a dedicated application server controls the particular communication service actually used, e.g. via VXML. Now, according to the invention, the application server can provide soft key functionalities e.g. via VXML, preferably in the same way it controls the media sequence.

According to the invention, it is proposed to use a part of the RTP transport protocol used for Real Time applications to control the functionalities of the soft keys. According to another aspect of the invention, the protocol preferably used for this purpose is the Real Time Control Protocol (RTCP), the control part of the Real Time Protocol (RTP).

RTCP already provides a way to transport commands comprising the essential information required to remotely assign specific functionalities to soft keys in real time. RTCP does not have to be changed or extended to transport this information. According to the invention, preferably just the relevant packet is used to transport the relevant information required to remotely control soft keys of a terminal.

Thereby it is thinkable to use different real time protocols to transport the commands used to remotely control the functionalities dedicated to the soft keys.

A first protocol preferably to be used between the application server and the media server is VXML. VXML can comprise the relevant information about the soft key control. An easy way to do this is to include a grammar oriented soft key, like for DTMF or ASR grammar, with a new mime type.

In VXML, a grammar is the formal description of awaited user inputs. With a grammar, the application lists all user inputs it understands and treats. In a VXML document, a soft key is described by its position on the user terminal, the label to display on the user terminal and the corresponding DTMF to send by the user terminal:

<softkey position><softkey label><dtmf to generate>

A screen grammar is a set of soft key definitions activated at the same time. A VXML application can define different screens and can activate only one in the same time. An example for such a grammar is given in the following:

```
<screen type="SCR1">
<item>0 play 1</item>
<item>1 stop 2 </item>
</screen>
```

A second protocol is RTCP. RTCP already comprises a way to transport "application dependent data" as defined in RFC 1889 chapter 6.6 "APP: Application-defined RTCP packet".

It is important to mention that a method according to the invention that is used to remotely control an end user terminal via an application server, can be executed in the following way:

Access by a server, e.g. a media server to an application or an application server dedicated to said terminal, said application providing at least one communication service to be used via said terminal;

Forward by the server some command from said application to be activated on the terminal, the command being transmitted to the terminal using some real time protocol, e.g. RTCP;

In case said application comprises some audio message to be played on said terminal, forwarding said audio message by the server to the terminal using some real time protocol, e.g. RTP.

Thereby it is thinkable, that if a specific return to that command is generated on that communications terminal, to forward the specific return to that server using RTP.

Furthermore it is thinkable that the server processes the application when accessing it to generate the command to be forwarded in RTCP and if available the audio message to be forwarded in RTP.

Preferably it is desirable letting the application accessible to the server in VXML format possibly including some Dual Tone Multi-Frequency message.

COMMERCIAL APPLICABILITY

The invention is commercially applicable particularly in the field of providing Unified Messaging Services, production and operation of networks to be used to provide Unified Messaging Services and production and operation of Unified Messaging Systems.

The invention claimed is:

1. A computer-executable method, to remotely interact with an application server of a Unified Messaging System, comprising remotely interacting with the UMS via an end user terminal featuring soft keys, wherein at least one functionality is changeably dedicated to at least one soft key and is remotely controllable by the application server in real time, wherein commands used from the application server to remotely control the soft key functionalities of the terminal are transported between the application server and the end user terminal via a real-time protocol (RTP), and wherein the real time protocol is used to exchange audio messages between the terminal and a server, wherein parts of said real time protocol contribute to transporting commands used to remotely control the soft key functionalities as well as the specific returns generated by user inputs via said soft keys between the application server and the terminal.

2. The method according to claim 1, wherein specific returns generated by user inputs via said soft keys are exchanged between the terminal and the application server via a real time protocol (RTP).

3. The method according to claim 1, wherein the commands and/or the specific returns to be exchanged between a media server providing access to at least one application server and the end user terminal and/or vice versa are transported using a real time control protocol (RTCP).

4. The method according to claim 3, wherein an application defined (APP) packet of the RTCP is used to transport the commands and/or the specific returns to be exchanged between the media server and the end user terminal and/or vice versa.

5. The method according to claim 1, wherein the commands and/or the specific returns to be exchanged between the application server and a media server and/or vice versa are transported using voice extensible markup language (VXML).

6. A Unified Messaging Communication System comprising of at least one server and at least one end user terminal remotely attached to and remotely controllable by said server, said server providing at least one application to be dedicated to said terminal, wherein said terminal features at least one soft key with at least one dedicated functionality, wherein the system comprises means to remotely control at least one functionality dedicated to said soft key by said server using a real time protocol (RTP), and wherein the real time protocol is used to exchange audio messages between the terminal and a server, wherein parts of said real time protocol contribute to transporting commands used to remotely control the soft key functionalities as well as the specific returns generated by user inputs via said soft keys between the application server and the terminal.

7. A Unified Messaging Communication System comprising at least one server and at least one end user terminal remotely attached to and remotely controllable by said server, said server providing at least one application to be dedicated to said terminal, wherein said terminal features at least one soft key with at least one dedicated functionality, wherein the system comprises means to remotely control at least one functionality dedicated to said soft key by said server using a real time protocol (RTP), and further comprising means to dedicate at least one changeable functionality to said soft key and means to let a server of said communication system remotely control at least one functionality dedicated to said soft key in real time, and wherein the real time protocol is used to exchange audio messages between the terminal and a server, wherein parts of said real time protocol contribute to transporting commands used to remotely control the soft key functionalities as well as the specific returns generated by user inputs via said soft keys between the application server and the terminal.

8. The server according to claim 6, wherein the server comprises means to remotely control at least one functionality dedicated to at least one soft key of a terminal remotely attached to said server in real time.

9. The Unified Messaging Communication System according to claim 6, further including a media server, wherein the system employs a real-time transfer control protocol (RTCP) to transfer commands and/or specific returns exchanged between the media server providing access to at least one server and the end user terminal and/or vice versa.

10. The Unified Messaging Communication System according to claim 9, wherein the media server and the end user terminal communicate using an application defined (APP) packet of the RTCP to transport the commands and/or the specific returns exchanged between the media server and the end user terminal and/or vice versa.

11. The Unified Messaging Communication System according to claim 6, wherein the commands and/or the specific returns exchanged between the application server and a media server and/or vice versa are transported using voice extensible markup language (VXML).

12. The server according to claim 7, further comprising means to remotely control at least one functionality dedicated to at least one soft key of a terminal remotely attached to said server in real time.

13. The Unified Messaging Communication System according to claim 7, further including a media server, wherein the system employs a real-time transfer control protocol (RTCP) to transfer commands and/or specific returns exchanged between the media server providing access to at least one server and the end user terminal and/or vice versa.

14. The Unified Messaging Communication System according to claim 13, wherein the media server and the end user terminal communicate using an application defined (APP) packet of the RTCP to transport the commands and/or the specific returns exchanged between the media server and the end user terminal and/or vice versa.

15. The Unified Messaging Communication System according to claim 7, wherein the commands and/or the specific returns exchanged between the application server and a media server and/or vice versa are transported using voice extensible markup language (VXML).

* * * * *